(12) United States Patent
Tsubonoya

(10) Patent No.: US 12,372,761 B2
(45) Date of Patent: Jul. 29, 2025

(54) VARIABLE MAGNIFICATION OPTICAL SYSTEM, OPTICAL EQUIPMENT, AND METHOD FOR PRODUCING VARIABLE MAGNIFICATION OPTICAL SYSTEM

(71) Applicant: Nikon Corporation, Tokyo (JP)

(72) Inventor: Keisuke Tsubonoya, Yokohama (JP)

(73) Assignee: Nikon Corporation, Tokyo (JP)

( * ) Notice: Subject to any disclaimer, the term of this patent is extended or adjusted under 35 U.S.C. 154(b) by 113 days.

(21) Appl. No.: 17/425,470

(22) PCT Filed: Jan. 28, 2019

(86) PCT No.: PCT/JP2019/002742
§ 371 (c)(1),
(2) Date: Jul. 23, 2021

(87) PCT Pub. No.: WO2020/157801
PCT Pub. Date: Aug. 6, 2020

(65) Prior Publication Data
US 2022/0091400 A1    Mar. 24, 2022

(51) Int. Cl.
*G02B 15/14* (2006.01)
(52) U.S. Cl.
CPC .............. *G02B 15/143507* (2019.08)
(58) Field of Classification Search
CPC ........ G02B 15/143507; G02B 15/20; G02B 13/18; G02B 15/143503; G02B 15/14;
(Continued)

(56) References Cited

U.S. PATENT DOCUMENTS 4,168,110 A * 9/1979 Itoh ................ G02B 15/143503
359/680
5,867,325 A * 2/1999 Ohtake ................ G02B 15/177
359/689
(Continued)

FOREIGN PATENT DOCUMENTS

JP    H10-293253 A    11/1998
JP    H11-023967 A    1/1999
(Continued)

OTHER PUBLICATIONS

"Ohara GmbH","ohara glass catalog" Jun. 2003 : http://www.rdphotonics.com/upfiles/file/OHARA.pdf (Year: 2003).*
(Continued)

*Primary Examiner* — Thomas K Pham
*Assistant Examiner* — Kuei-Jen L Edenfield
(74) *Attorney, Agent, or Firm* — Potomac Law Group, PLLC

(57) ABSTRACT

A variable magnification optical system which comprises, in order from an object side, a first lens group having negative refractive power, a second lens group having positive refractive power and a third lens group; upon varying magnification, distances between the neighboring respective lens groups being varied; upon focusing, the first lens group and the second lens group being moved along the optical axis; and predetermined conditional expression(s) being satisfied, whereby the variable magnification optical system is made in small in size, and can correct superbly various aberrations.

22 Claims, 8 Drawing Sheets

(58) Field of Classification Search
CPC .......................... G02B 15/177; G02B 15/143;
G02B 15/1435; G02B 15/144503; G02B
15/144507; G02B 15/144515; G02B
15/144511
USPC ................................ 359/670, 676, 684, 695
See application file for complete search history.

(56) References Cited

U.S. PATENT DOCUMENTS

| | | | |
|---|---|---|---|
| 5,909,318 | A | 6/1999 | Tanaka |
| 6,124,984 | A | 9/2000 | Shibayama et al. |
| 6,542,301 | B1 | 4/2003 | Fujibayashi |
| 2001/0036020 | A1 | 11/2001 | Yamamoto |
| 2002/0191306 | A1 | 12/2002 | Toyama |
| 2005/0134969 | A1 | 6/2005 | Shinohara |
| 2005/0134971 | A1 | 6/2005 | Yamashita |
| 2006/0221463 | A1 | 10/2006 | Enomoto |
| 2007/0103791 | A1* | 5/2007 | Hankawa ....... G02B 15/143507 359/680 |
| 2007/0171544 | A1 | 7/2007 | Noda |
| 2014/0085732 | A1* | 3/2014 | Shibata ................ G02B 15/177 359/680 |
| 2016/0187629 | A1* | 6/2016 | Tabata ........... G02B 15/144511 359/689 |
| 2017/0068078 | A1* | 3/2017 | Takakubo .......... G02B 13/0045 |
| 2018/0003944 | A1 | 1/2018 | Fujii |
| 2019/0053695 | A1 | 2/2019 | Fujii et al. |

FOREIGN PATENT DOCUMENTS

| | | |
|---|---|---|
| JP | H11-133302 A | 5/1999 |
| JP | 2001-108895 A | 4/2001 |
| JP | 2001-343587 A | 12/2001 |
| JP | 2002-169090 A | 6/2002 |
| JP | 2002-277739 A | 9/2002 |
| JP | 2002-372667 A | 12/2002 |
| JP | 2005-181499 A | 7/2005 |
| JP | 2005-181774 A | 7/2005 |
| JP | 2005-301031 A | 10/2005 |
| JP | 2006-276445 A | 10/2006 |
| JP | 2007-193140 A | 8/2007 |
| JP | 4884783 B2 | 2/2012 |
| WO | WO 2017/043352 A1 | 3/2017 |
| WO | WO 2017/146021 A1 | 8/2017 |

OTHER PUBLICATIONS

Office Action issued Sep. 13, 2022, in Japanese Patent Application No. 2020-568891.
International Search Report from International Patent Application No. PCT/JP2019/002742, Apr. 23, 2019.
Office Action issued Mar. 29, 2022, in Japanese Patent Application No. 2020-568891.
Office Action issued Jan. 26, 2022, in Chinese Patent Application No. 201980089405.8.

* cited by examiner

VARIABLE MAGNIFICATION OPTICAL SYSTEM, OPTICAL EQUIPMENT, AND METHOD FOR PRODUCING VARIABLE MAGNIFICATION OPTICAL SYSTEM

TECHNICAL FIELD

The present invention relates to a variable magnification optical system, an optical equipment and a method for manufacturing the variable magnification optical system.

BACKGROUND ART

Conventionally, a variable magnification optical system suitable to be used in a lens exchangeable type camera has been made compact and improved in optical performance (For example, refer to a Patent Document 1 as below mentioned). However, further compactness and further improvement in optical performance are desired.

PRIOR ART REFERENCE

Patent Document

Patent Document 1: Japan Patent No. 4884783.

SUMMARY OF THE INVENTION

According to a first aspect, there is provided a variable magnification optical system comprising, in order from an object side, a first lens group having negative refractive power, a second lens group having positive refractive power, and a third lens group;
upon varying magnification, intervals between the neighboring respective lens groups being varied;
upon focusing, the first and the second lens groups being moved along the optical axis; and
the following conditional expression being satisfied:

$$1.00 < (-f1)/f2 < 3.00 \quad (1)$$

where f1 denotes a focal length of the first lens group, and f2 denotes a focal length of the second lens group.

According to a second aspect, there is provided a method for manufacturing a variable magnification optical system comprising, in order from an object side, a first lens group having negative refractive power, a second lens group having positive refractive power, and a third lens group, the method comprising steps of:
constructing such that, upon varying magnification, intervals between the neighboring respective lens groups are varied;
constructing such that, upon focusing, the first lens group and the second lens group are moved along the optical axis; and
constructing such that the following conditional expression is satisfied:

$$1.00 < (-f1)/f2 < 3.00 \quad (1)$$

where f1 denotes a focal length of the first lens group, and f2 denotes a focal length of the second lens group.

EMBODIMENT FOR CARRYING OUT THE INVENTION

Figure 1A:
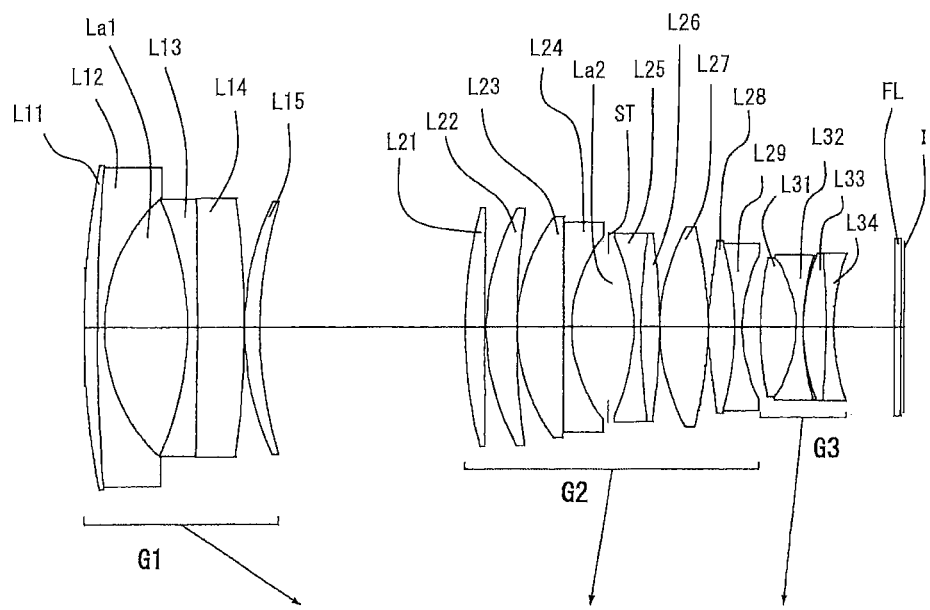
FIG. 1A, FIG. 1B and FIG. 1C are, respectively, sectional views showing wide angle end state, intermediate focal length state and tele photo end state, of a variable magnification optical system according to a First Example.

Next, a variable magnification optical system according to a present embodiment, an optical equipment and a method for producing the variable magnification optical system, will be explained with reference to the accompanying drawings.

The variable magnification optical system according to the present embodiment comprises, in order from an object side, a first lens group having negative refractive power, a second lens group having positive refractive power, and a third lens group;
upon varying magnification, intervals between the neighboring respective lens groups being varied;
upon focusing, the first lens group and the second lens group being moved along the optical axis; and
the following conditional expression (1) being satisfied:

$$1.00 < (-f1)/f2 < 3.00 \quad (1)$$

where f1 denotes a focal length of the first lens group, and f2 denotes a focal length of the second lens group.

The variable magnification optical system according to the present embodiment comprises, in order from the object side, the first lens group having negative refractive power, the second lens group having positive refractive power, and the third lens group; and upon varying magnification, intervals between the neighboring respective lens groups being varied. Taking such a configuration, the variable magnification optical system according to the present embodiment can realize varying magnification and correct superbly various aberrations.

Further, according to the variable magnification optical system according to the present embodiment, the first lens group and the second lens group are moved along the optical axis, upon focusing. With such configuration, the variable magnification optical system according to the present embodiment can secure sufficient magnification ratio.

The conditional expression (1) is a conditional expression for determining a proper range with respect to a ratio of the focal length of the first lens group relative to the focal length of the second lens group. With satisfying the conditional expression (1), sufficient magnification varying ratio can be secured while suppressing various aberrations such as spherical aberration or coma aberration.

When the variable magnification optical system according to the present embodiment does not satisfy the conditional expression (1), the relationship between the focal length of the first lens group and the focal length of the second lens group becomes not proper, so it becomes difficult to suppress the spherical aberration as well as coma aberration.

Meanwhile, when the upper limit value of the conditional expression (1) is set to 2.90, it is possible to attain the advantageous effect of the present embodiment more surely. In order to ensure the advantageous effect of the present embodiment more surely, it is preferable to set the upper limit value of the conditional expression (1) to 2.80, 2.70, 2.60, 2.50, 2.40, 2.30, 2.20, 2.10, 2.08, and further to 2.05.

On the other hand, when the lower limit value of the conditional expression (1) is set to 1.10, it is possible to attain the advantageous effect of the present embodiment more surely. In order to ensure the advantageous effect of the present embodiment more surely, it is preferable to set the lower limit value of the conditional expression (1) to 1.20, 1.30, 1.40, 1.50, 1.60, 1.70, and further to 1.71.

Taking the configuration as mentioned above, the variable magnification optical system according to the present embodiment, can correct superbly spherical aberration, coma aberration and other various aberrations.

The variable magnification optical system according to the present embodiment comprises, in order from the object side, the first lens group having negative refractive power, the second lens group having positive refractive power, and the third lens group; upon varying a magnification, intervals between the neighboring respective lens groups being varied; and the first lens group and the second lens group each comprising at least one convex-shaped air lens.

The variable magnification optical system according to the present embodiment comprises, in order from the object side, the first lens group having negative refractive power, the second lens group having positive refractive power, and the third lens group; and upon varying magnification, intervals between the neighboring respective lens groups being varied.

With such configuration, the variable magnification optical system according to the present embodiment can realize varying magnification and correct various aberrations superbly.

Further, in the variable magnification optical system according to the present embodiment, the first lens group and the second lens group each comprise at least one convex-shaped air lens. With such configuration, the variable magnification optical system according to the present embodiment can correct various aberrations superbly and attain excellent optical performance.

Meanwhile, the term "air lens" means a lens formed by an air portion between the neighboring lenses.

Further, in the variable magnification optical system according to the present embodiment, it is desirable that the following conditional expression (2) is satisfied:

$$2.50 < (-f1)/fw < 3.50 \qquad (2)$$

where f1 denotes a focal length of the first lens group, and fw denotes a focal length of the variable magnification optical system in the wide angle end state.

The conditional expression (2) is a conditional expression for determining a proper range with respect to a ratio of the focal length of the first lens group relative to the focal length of the variable magnification optical system in the wide angle end state. With satisfying the conditional expression (2), the variable magnification optical system according to the present embodiment can correct superbly various aberrations such as spherical aberration as well as coma aberration.

When the variable magnification optical system according to the present embodiment does not satisfy the conditional expression (2), the relationship of the focal length of the first lens group with the focal length of the variable magnification optical system in the wide angle end state becomes not appropriate, so it becomes difficult to correct superbly various aberrations such as spherical aberration as well as coma aberration.

Meanwhile, when the upper limit value of the conditional expression (2) is set to 3.40, it is possible to attain the advantageous effect of the present embodiment more surely. In order to ensure the advantageous effect of the present embodiment more surely, it is preferable to set the upper limit value of the conditional expression (2) to 3.30, 3.20, 3.15, 3.10, 3.05, and further to 3.00.

On the other hand, when the lower limit value of the conditional expression (2) is set to 2.60, it is possible to attain the advantageous effect of the present embodiment more surely. In order to ensure the advantageous effect of the present embodiment more surely, it is preferable to set the lower limit value of the conditional expression (2) to 2.70, 2.75, 2.80, 2.85, 2.90, and further to 2.92.

Further, in the variable magnification optical system according to the present embodiment, it is desirable that the following conditional expression (3) is satisfied:

$$FNo < 1.45 \qquad (3)$$

where FNo denotes an F-number of the variable magnification optical system.

The conditional expression (3) is a conditional expression for defining a proper range of the F-number of the variable magnification optical system. With satisfying the conditional expression (3), the variable magnification optical system according to the present embodiment can realize an optical system which can take pictures superbly in an entire zoom region and even in a dark environment.

When the value of FNo exceeds the upper limit value in the conditional expression (3) of the variable magnification optical system according to the present embodiment, it becomes not possible to provide a picture of a high quality in a dark environment which is short of brightness.

Meanwhile, when the upper limit value of the conditional expression (3) is set to 1.41, it is possible to attain the advantageous effect of the present embodiment more surely. In order to ensure the advantageous effect of the present embodiment more surely, it is preferable to set the upper limit value of the conditional expression (3) to 1.38, 1.35, 1.33, 1.30, 1.28, 1.25 and further to 1.24.

Further, in the variable magnification optical system according to the present embodiment, it is desirable that the second lens group comprises a first positive lens at a most object side, and satisfies the following conditional expression (4):

$$1.50 < f21/f2 < 4.50 \quad (4)$$

where f21 denotes a focal length of the first positive lens, and f2 denotes a focal length of the second lens group.

Since the second lens group comprises the first positive lens at the most object side, the variable magnification optical system according to the present embodiment can be prevented from being enlarged in diameter dimension and can correct superbly coma aberration.

The conditional expression (4) is a conditional expression for defining a proper range of a ratio of the focal length of the first positive lens to the focal length of the second lens group. With satisfying the conditional expression (4), the variable magnification optical system according to the present embodiment can refract light rays with no difficulty and can correct superbly spherical aberration as well as coma aberration.

When the variable magnification optical system according to the present embodiment does not satisfy the conditional expression (4), the relationship between the focal length of the first positive lens and the focal length of the second lens group becomes not appropriate. Thus, spherical aberration as well as coma aberration would be generated, and it would become difficult to make corrections of them and the optical system would become extremely enlarged.

Meanwhile, when the upper limit value of the conditional expression (4) is set to 4.40, it is possible to attain the advantageous effect of the present embodiment more surely. In order to ensure the advantageous effect of the present embodiment more surely, it is preferable to set the upper limit value of the conditional expression (4) to 4.30, 4.20, 4.10, 4.00, 3.90 and further to 3.80.

On the other hand, when the lower limit value of the conditional expression (4) is set to 1.60, it is possible to attain the advantageous effect of the present embodiment more surely. In order to ensure the advantageous effect of the present embodiment more surely, it is preferable to set the lower limit value of the conditional expression (4) to 1.70, 1.80, 1.90, 2.00, 2.10, and further to 2.20.

Further, in the variable magnification optical system according to the present embodiment, it is desirable that the second lens group comprises, in order from a most object side, first positive lens and a second positive lens, and satisfies the following conditional expression (5):

$$1.00 < f22/f2 < 3.50 \quad (5)$$

where f22 denotes a focal length of the second positive lens, and f2 denotes a focal length of the second lens group.

Since the second lens group comprises, in order from the most object side, the first positive lens and the second positive lens, the variable magnification optical system according to the present embodiment can correct superbly aberrations in spite that its aperture diameter is large.

The conditional expression (5) is a conditional expression for defining a proper range of a ratio of the focal length of the second positive lens to the focal length of the second lens group. With satisfying the conditional expression (5), the variable magnification optical system according to the present embodiment can correct superbly spherical aberration as well as coma aberration.

When the variable magnification optical system according to the present embodiment does not satisfy the conditional expression (5), the relationship between the focal length of the second positive lens and the focal length of the second lens group becomes not appropriate. Thus, it would become difficult to correct spherical aberration as well as coma aberration, or the optical system would become extremely large in size.

Meanwhile, when the upper limit value of the conditional expression (5) is set to 3.40, it is possible to attain the advantageous effect of the present embodiment more surely. In order to ensure the advantageous effect of the present embodiment more surely, it is preferable to set the upper limit value of the conditional expression (5) to 3.30, 3.20, 3.10, 3.00, 2.90, 2.80, 2.70, 2.60, 2.50, 2.40, 2.30 and further to 2.25.

On the other hand, when the lower limit value of the conditional expression (5) is set to 1.10, it is possible to attain the advantageous effect of the present embodiment more surely. In order to ensure the advantageous effect of the present embodiment more surely, it is preferable to set the lower limit value of the conditional expression (5) to 1.20, 1.25, 1.30, 1.35, 1.40, and further to 1.45.

Further, in the variable magnification optical system according to the present embodiment, it is desirable that the second lens group comprises, in order from a most object side, a first positive lens and a second positive lens, and satisfies the following conditional expression (6):

$$0.50 < f2F/f2 < 2.00 \quad (6)$$

where f2F denotes a composite focal length of the first positive lens and the second positive lens, and f2 denotes the focal length of the second lens group.

By the second lens group comprising, in order from the most object side, the first positive lens and the second positive lens, the variable magnification optical system according to the present embodiment can correct superbly aberrations in spite that its aperture diameter is large.

The conditional expression (6) is a conditional expression for defining a proper range of a ratio of the composite focal length of the first positive lens and the second positive lens to the focal length of the second lens group. With satisfying the conditional expression (6), the variable magnification optical system according to the present embodiment can be made small in size and correct superbly aberrations.

When the variable magnification optical system according to the present embodiment does not satisfy the conditional expression (6), the relationship between the composite focal length of the first positive lens and the second positive lens and the focal length of the second lens group becomes not appropriate. Thus, the optical system would become extremely large in size and it would become difficult to correct spherical aberration as well as coma aberration.

Meanwhile, when the upper limit value of the conditional expression (6) is set to 1.90, it is possible to attain the advantageous effect of the present embodiment more surely. In order to ensure the advantageous effect of the present embodiment more surely, it is preferable to set the upper limit value of the conditional expression (6) to 1.80, 1.70, 1.60, 1.50, 1.40, 1.30, 1.20, and further to 1.15.

On the other hand, when the lower limit value of the conditional expression (6) is set to 0.60, it is possible to attain the advantageous effect of the present embodiment more surely. In order to ensure the advantageous effect of the present embodiment more surely, it is preferable to set the lower limit value of the conditional expression (6) to 0.70, 0.80, 0.90, 0.95, 1.00 and further to 1.05.

Further, in the variable magnification optical system according to the present embodiment, it is desirable that the second lens group comprises a partial lens group consisting of, in order from the object side, consecutively, an "a" positive lens, an "a" negative lens, a "b" negative lens and a "b" positive lens; an air lens formed by the opposing surfaces of the "a" negative lens and the "b" negative lens being double convex-shaped; at least one positive lens being disposed at an object side than the partial group, and the following conditional expression (7) is satisfied:

$$0.50 < f2A/f2 < 2.00 \quad (7)$$

where f2A denotes a composite focal length of all of positive lenses disposed at the object side than the partial lens group, and f2 denotes the focal length of the second lens group.

In the variable magnification optical system according to the present embodiment, the second lens group comprises the partial lens group consisting of, in order from the object side, consecutively, the "a" positive lens, the "a" negative lens, the "b" negative lens and the "b" positive lens; and the air lens formed by the opposing surfaces of the "a" negative lens and the "b" negative lens, is double convex-shaped. With such configuration, the variable magnification optical system according to the present embodiment can correct superbly spherical aberration and coma aberration, while having an effect of correcting curvature of field. Further, in the variable magnification optical system according to the present embodiment, there is disposed at least one positive lens at the object side than the partial lens group, so spherical aberration can be corrected more effectively.

The conditional expression (7) is a conditional expression for defining a proper range of a ratio of the composite focal length of all the positive lenses disposed at the object side than the partial lens group to the focal length of the second lens group. With satisfying the conditional expression (7), the variable magnification optical system according to the present embodiment can be made small in size and correct superbly aberrations.

When the variable magnification optical system according to the present embodiment does not satisfy the conditional expression (7), the relationship between the composite focal length of all the positive lenses disposed at the object side than the partial lens group and the focal length of the second lens group, becomes not appropriate. Thus, the optical system would become extremely large in size and it would become difficult to correct spherical aberration as well as coma aberration.

Meanwhile, when the upper limit value of the conditional expression (7) is set to 1.90, it is possible to attain the advantageous effect of the present embodiment more surely. In order to ensure the advantageous effect of the present embodiment more surely, it is preferable to set the upper limit value of the conditional expression (7) to 1.80, 1.70, 1.60, 1.50, 1.40, 1.30, 1.20, and further to 1.15.

On the other hand, when the lower limit value of the conditional expression (7) is set to 0.60, it is possible to attain the advantageous effect of the present embodiment more surely. In order to ensure the advantageous effect of the present embodiment more surely, it is preferable to set the lower limit value of the conditional expression (7) to 0.70, 0.80, 0.90, 0.95, 1.00 and further to 1.05.

Further, in the variable magnification optical system according to the present embodiment, it is desirable that the first lens group comprises a positive lens at a most image plane side, and satisfies the following conditional expression (8):

$$1.00 < f1R/(-f1) < 6.00 \quad (8)$$

where f1R denotes a focal length of the positive lens disposed at the most image plane side in the first lens group, and f1 denotes a focal length of the first lens group.

Since the first lens group according to the present embodiment comprises the positive lens at the most image plane side, the variable magnification optical system according to the present embodiment can correct superbly spherical aberration.

The conditional expression (8) is a conditional expression for defining a proper range of a ratio of the focal length of the positive lens disposed at the most image plane side in the first lens group to the focal length of the first lens group. With satisfying the conditional expression (8), the variable magnification optical system according to the present embodiment can correct superbly spherical aberration.

When the variable magnification optical system according to the present embodiment does not satisfy the conditional expression (8), the relationship between the focal length of the first positive lens disposed at the most image plane side in the first lens group and the focal length of the first lens group, becomes not proper, and it becomes difficult to correct spherical aberration.

Meanwhile, when the upper limit value of the conditional expression (8) is set to 5.80, it is possible to attain the advantageous effect of the present embodiment more surely. In order to ensure the advantageous effect of the present embodiment more surely, it is preferable to set the upper limit value of the conditional expression (8) to 5.60, 5.50, 5.30, 5.20, 5.10, 5.00 and further to 4.90.

On the other hand, when the lower limit value of the conditional expression (8) is set to 1.10, it is possible to attain the advantageous effect of the present embodiment more surely. In order to ensure the advantageous effect of the present embodiment more surely, it is preferable to set the lower limit value of the conditional expression (8) to 1.20, 1.30, 1.40, 1.50, 1.60, and further to 1.70.

Further, in the variable magnification optical system according to the present embodiment, it is desirable that the following conditional expression (9) is satisfied:

$$1.80 < r3R/Bf3w < 4.30 \quad (9)$$

where r3R denotes a radius of curvature of an image side lens surface of a lens disposed at a most image plane side in the third lens group, and Bf3w denotes an air conversion distance on the optical axis from the image side lens surface of the lens disposed at the most image plane side in the third lens group in the wide angle end state to the image plane.

The conditional expression (9) is a conditional expression for defining a proper range of a ratio of the radius of curvature of the image plane side lens surface of the lens disposed at the most image plane side in the third lens group to the air conversion distance on the optical axis from the image plane side lens surface of the lens disposed at the most image plane side in the third lens group in the wide angle end state to the image plane. With satisfying the conditional expression (9), the variable magnification optical system according to the present embodiment can correct superbly curvature of field and spherical aberration.

When the variable magnification optical system according to the present embodiment does not satisfy the conditional expression (9), the relationship between the radius of curvature of the image plane side lens surface of the lens disposed at the most image plane side in the third lens group and the air conversion distance on the optical axis from the image plane side lens surface of the lens disposed at the most image plane side in the third lens group in the wide angle end state to the image plane, becomes not appropriate, so it becomes difficult to correct curvature of field and spherical aberration.

Meanwhile, when the upper limit value of the conditional expression (9) is set to 4.20, it is possible to attain the advantageous effect of the present embodiment more surely. In order to ensure the advantageous effect of the present embodiment more surely, it is preferable to set the upper limit value of the conditional expression (9) to 4.10, 4.00, 3.90, 3.80, 3.70, 3.60, 3.50, 3.40, 3.30 and further to 3.26.

On the other hand, when the lower limit value of the conditional expression (9) is set to 2.00, it is possible to attain the advantageous effect of the present embodiment more surely. In order to ensure the advantageous effect of the present embodiment more surely, it is preferable to set the lower limit value of the conditional expression (9) to 2.10, 2.20, 2.30, 2.40, 2.50 and further to 2.60.

Further, in the variable magnification optical system according to the present embodiment, it is desirable that the following conditional expression (10) is satisfied:

$$0.50 < r2R/Bf2w < 2.20 \quad (10)$$

where r2R denotes a radius of curvature of an image plane side lens surface of a lens disposed at a most image plane side in the second lens group, and Bf2w denotes an air-conversion distance on the optical axis from an image plane side lens surface of the lens disposed at the most image plane side in the second lens group in the wide angle end state to the image plane.

The conditional expression (10) is a conditional expression for defining a proper range of a ratio of the radius of curvature of the image plane side lens surface of the lens disposed at the most image plane side in the second lens group to the air-conversion distance on the optical axis from the image plane side lens surface of the lens disposed at the most image plane side in the second lens group in the wide angle end state to the image plane. With satisfying the conditional expression (10), the variable magnification optical system according to the present embodiment can correct superbly spherical aberration and curvature of field.

When the variable magnification optical system according to the present embodiment does not satisfy the conditional expression (10), the relationship between the radius of curvature of the image plane side lens surface of the lens disposed at the most image plane side in the second lens group and the air-conversion distance on the optical axis from the image plane side lens surface of the lens disposed at the most image plane side in the second lens group in the wide angle end state to the image plane, becomes not appropriate, so it becomes difficult to correct spherical aberration and curvature of field.

Meanwhile, when the upper limit value of the conditional expression (10) is set to 2.00, it is possible to attain the advantageous effect of the present embodiment more surely. In order to ensure the advantageous effect of the present embodiment more surely, it is preferable to set the upper limit value of the conditional expression (10) to 1.90, 1.80, 1.70, 1.60, 1.50, 1.40, 1.35, and further to 1.32.

On the other hand, when the lower limit value of the conditional expression (10) is set to 0.60, it is possible to attain the advantageous effect of the present embodiment more surely. In order to ensure the advantageous effect of the present embodiment more surely, it is preferable to set the lower limit value of the conditional expression (10) to 0.70, 0.80, 0.90, 1.00, 1.10, 1.15 and further to 1.20.

Further, in the variable magnification optical system according to the present embodiment, it is desirable that the following conditional expression (11) is satisfied:

$$0.15 < Bfw/fw < 1.00 \quad (11)$$

where Bfw denotes a back focus of the variable magnification optical system in the wide angle end state, and fw denotes a focal length of the variable magnification optical system in the wide angle end state.

The conditional expression (11) is a conditional expression for defining a proper range of a ratio of the back focus of the variable magnification optical system in the wide angle end state to the focal length of the variable magnification optical system in the wide angle end state. With satisfying the conditional expression (11), the variable magnification optical system according to the present embodiment can correct superbly coma aberration and other various aberrations in the wide angle end state superbly.

When the variable magnification optical system according to the present embodiment does not satisfy the conditional expression (11), the relationship between the focal length and the back focus of the variable magnification optical system in the wide angle end state becomes not proper, so it becomes difficult to correct coma aberration and other various aberrations in the wide angle end state.

Meanwhile, when the upper limit value of the conditional expression (11) is set to 0.90, it is possible to attain the advantageous effect of the present embodiment more surely. In order to ensure the advantageous effect of the present embodiment more surely, it is preferable to set the upper limit value of the conditional expression (11) to 0.80, 0.70, 0.65, 0.60, 0.55 and further to 0.53.

On the other hand, when the lower limit value of the conditional expression (11) is set to 0.18, it is possible to attain the advantageous effect of the present embodiment more surely. In order to ensure the advantageous effect of the present embodiment more surely, it is preferable to set the lower limit value of the conditional expression (11) to 0.20, 0.22, 0.24, 0.25, 0.28, 0.30, 0.32, 0.34 and further to 0.35.

Further, in the variable magnification optical system according to the present embodiment, it is desirable that the following conditional expression (12) is satisfied:

$$35.00° < 2\omega w < 80.00° \quad (12)$$

where 2ωw denotes a whole angle of view of the variable magnification optical system in the wide angle end state.

The conditional expression (12) is a conditional expression for defining a proper range of the whole angle of view of the variable magnification optical system in the wide angle end state. With satisfying the conditional expression (12), the variable magnification optical system according to the present embodiment can suppress variations in aberrations in the wide angle end state, while attaining wide angle of view.

Meanwhile, when the upper limit value of the conditional expression (12) is set to 78.00°, it is possible to attain the advantageous effect of the present embodiment more surely. In order to ensure the advantageous effect of the present embodiment more surely, it is preferable to set the upper limit value of the conditional expression (12) to 76.00°, 75.00°, 74.00° and further to 73.00°.

On the other hand, when the lower limit value of the conditional expression (12) is set to 38.00°, it is possible to attain the advantageous effect of the present embodiment more surely. In order to ensure the advantageous effect of the present embodiment more surely, it is preferable to set the lower limit value of the conditional expression (12) to 40.00°, 42.00°, 45.00°, 46.00° and further to 47.00°.

Further, in the variable magnification optical system according to the present embodiment, it is desirable that the following conditional expression (13) is satisfied:

$$10.00° < 2\omega t < 60.00° \quad (13)$$

where 2ωt denotes a whole angle of view of the variable magnification optical system in the telephoto end state.

The conditional expression (13) is a conditional expression for defining a proper range of the whole angle of view of the variable magnification optical system in the telephoto end state. With satisfying the conditional expression (13), the variable magnification optical system according to the present embodiment can suppress variations in aberrations in the telephoto end state, while attaining wide angle of view.

Meanwhile, when the upper limit value of the conditional expression (13) is set to 55.00°, it is possible to attain the advantageous effect of the present embodiment more surely. In order to ensure the advantageous effect of the present embodiment more surely, it is preferable to set the upper limit value of the conditional expression (13) to 53.00°, 50.00°, 49.00°, 48.00° and further to 47.00°.

On the other hand, when the lower limit value of the conditional expression (13) is set to 11.00°, it is possible to attain the advantageous effect of the present embodiment more surely. In order to ensure the advantageous effect of the present embodiment more surely, it is preferable to set the lower limit value of the conditional expression (13) to 12.00°, 13.00°, 14.00°, 15.00° and further to 16.00°.

Further, in the variable magnification optical system according to the present embodiment, it is desirable that the first lens group comprises at least one positive lens that satisfies the following conditional expression (14):

$$0.673 < \theta gFLp + 0.0022 * vdLp < 0.750 \quad (14)$$

where vdLp denotes an Abbe number to d-line of the positive lens, and θgFLp denotes a partial dispersion ratio by the g-line and the F-line of the positive lens.

Here, the Abbe number vdLp and the partial dispersion ratio θgFLp are, respectively, expressed by the following formulae:

$$vdLp = (nd - 1)/(nF - nC)$$

$$\theta gFLp = (ng - nF)/(nF - nC)$$

where nC denotes refractive index for the C-line (wavelength 656.3 nm), nd denotes refractive index for the d-line (wavelength 587.6 nm), nF denotes refractive index for the F-line (wavelength 486.1 nm), and ng denotes refractive index for the g-line (wavelength 435.8 nm).

The conditional expression (14) is a conditional expression for defining a glass material used for the positive lens in the first lens group. The variable magnification optical system comprising the positive lens satisfying the conditional expression (14), can correct longitudinal chromatic aberration superbly.

When the variable magnification optical system according to the present embodiment does not satisfy the conditional expression (14), it becomes difficult to correct longitudinal chromatic aberration superbly.

Meanwhile, when the upper limit value of the conditional expression (14) is set to 0.730, it is possible to attain the advantageous effect of the present embodiment more surely. In order to ensure the advantageous effect of the present embodiment more surely, it is preferable to set the upper limit value of the conditional expression (14) to 0.720, 0.710, 0.700, and further to 0.695.

On the other hand, when the lower limit value of the conditional expression (14) is set to 0.675, it is possible to attain the advantageous effect of the present embodiment more surely. In order to ensure the advantageous effect of the present embodiment more surely, it is preferable to set the lower limit value of the conditional expression (14) to 0.680, 0.685, 0.688, 0.690, and further to 0.692.

Further, in the variable magnification optical system according to the present embodiment, it is desirable that the following conditional expression (15) is satisfied:

$$0.50 < Pex/fw < 2.00 \quad (15)$$

where Pex denotes a distance from a paraxial exit pupil position to the image point, and fw denotes a focal length of the variable magnification optical system in the wide angle end state.

The conditional expression (15) is a conditional expression for defining a proper range of a ratio of the distance from the paraxial exit pupil position to the image point to the focal length of the variable magnification optical system in the wide angle end state.

With satisfying the conditional expression (15), the variable magnification optical system according to the present embodiment can be made small in size and excellent in performance.

When the variable magnification optical system according to the present embodiment does not satisfy the conditional expression (15), the relationship between the distance from the paraxial exit pupil position to the image point and the focal length of the variable magnification optical system in the wide angle end state, becomes not appropriate, so the optical system becomes extremely large in size and it becomes difficult to correct distortion.

Meanwhile, when the upper limit value of the conditional expression (15) is set to 1.90, it is possible to attain the advantageous effect of the present embodiment more surely. In order to ensure the advantageous effect of the present embodiment more surely, it is preferable to set the upper limit value of the conditional expression (15) to 1.80, 1.75, 1.70, 1.65, 1.64, and further to 1.62.

On the other hand, when the lower limit value of the conditional expression (15) is set to 0.60, it is possible to attain the advantageous effect of the present embodiment more surely. In order to ensure the advantageous effect of the present embodiment more surely, it is preferable to set the lower limit value of the conditional expression (15) to 0.70, 0.80, 0.90, 1.00, 1.05 and further to 1.10.

Further, in the optical system according to the present embodiment, it is desirable that each of the first lens group and the second lens group comprises one convex-shaped air lens, and that the following conditional expression is satisfied:

$$-1.00 < (r2L1 + r1L1)/(r2L1 - r1L1) < 3.00 \qquad (16)$$

where r1L1 denotes a radius of curvature of an object side lens surface of the air lens in the first lens group, and r2L1 denotes a radius of curvature of an image side lens surface of the air lens in the first lens group.

The conditional expression (16) is a conditional expression for defining a shape factor of the convex-shaped air lens in the first lens group. With satisfying the conditional expression (16), various aberrations can be corrected excellently and excellent optical performance can be obtained.

When the variable magnification optical system according to the present embodiment does not satisfy the conditional expression (16), the shape of the air lens becomes disadvantageous for marginal light flux. Accordingly, it becomes difficult to correct spherical aberration, distortion and curvature of field.

Meanwhile, when the upper limit value of the conditional expression (16) is set to 2.80, it is possible to attain the advantageous effect of the present embodiment more surely. In order to ensure the advantageous effect of the present embodiment more surely, it is preferable to set the upper limit value of the conditional expression (16) to 2.50, 2.30, 2.00, 1.80, 1.50, 1.30, and further to 1.00.

On the other hand, when the lower limit value of the conditional expression (16) is set to −0.08, it is possible to attain the advantageous effect of the present embodiment more surely. In order to ensure the advantageous effect of the present embodiment more surely, it is preferable to set the lower limit value of the conditional expression (16) to −0.05, −0.03, −0.01, 0.01, and further to 0.02.

Further, in the optical system according to the present embodiment, it is desirable that each of the first lens group and the second lens group comprises one convex-shaped air lens, and that the following conditional expression is satisfied:

$$-2.00 < (r2L2 + r1L2)/(r2L2 - r1L2) < 2.00 \qquad (17)$$

where r1L2 denotes a radius of curvature of an object side lens surface of the air lens in the second lens group, and r2L2 denotes a radius of curvature of an image side lens surface of the air lens in the second lens group.

The conditional expression (17) is a conditional expression for defining a shape factor of the air lens in the second lens group. With satisfying the conditional expression (17), various aberrations can be corrected excellently and excellent optical performance can be obtained.

When the variable magnification optical system according to the present embodiment does not satisfy the conditional expression (17), the shape of the air lens becomes disadvantageous for marginal light flux. Accordingly, it becomes difficult to correct spherical aberration, distortion and curvature of field.

Meanwhile, when the upper limit value of the conditional expression (17) is set to 1.90, it is possible to attain the advantageous effect of the present embodiment more surely. In order to ensure the advantageous effect of the present embodiment more surely, it is preferable to set the upper limit value of the conditional expression (17) to 1.80, 1.60, 1.50, 1.30, 1.20, 1.10, and further to 1.00.

On the other hand, when the lower limit value of the conditional expression (17) is set to −1.90, it is possible to attain the advantageous effect of the present embodiment more surely. In order to ensure the advantageous effect of the present embodiment more surely, it is preferable to set the lower limit value of the conditional expression (17) to −1.80, −1.60, −1.50, −1.30, −1.20, −1.10, and further to −1.00.

Further, in the optical system according to the present embodiment, it is desirable that each of the first lens group and the second lens group comprises one convex-shaped air lens, and that there are disposed 4 or more positive lenses between the air lens in the first lens group and the air lens in the second lens group. With taking such configuration, spherical aberration and other various aberrations can be corrected superbly.

An optical equipment according to the present embodiment comprises the variable magnification optical system having the above described configuration. With this configuration, it is possible to realize the optical equipment by which various aberrations can be corrected superbly and which has high performance and is small in size.

Further, a method for manufacturing a variable magnification optical system according to the present embodiment, is a method for manufacturing a variable magnification optical system which comprises, in order from an object side, a first lens group having negative refractive power, a second lens group having positive refractive power and a third lens group, the method comprising steps of:
constructing such that, upon varying magnification, intervals between the neighboring respective lens groups are varied;
constructing such that, upon focusing, the first lens group and the second lens group are moved along the optical axis; and constructing such that the following conditional expression (1) is satisfied:

$$1.00 < (-f1)/f2 < 3.00 \quad (1)$$

where f1 denotes a focal length of the first lens group, and f2 denotes a focal length of the second lens group.

In such a way, it is possible to realize a method for manufacturing a variable magnification optical system that can correct various aberrations superbly, has high performance and is small in size.

Hereinafter, variable magnification optical systems relating to numerical examples according to the present embodiment will be explained with reference to the accompanying drawings.

First Example

Figure 1B:
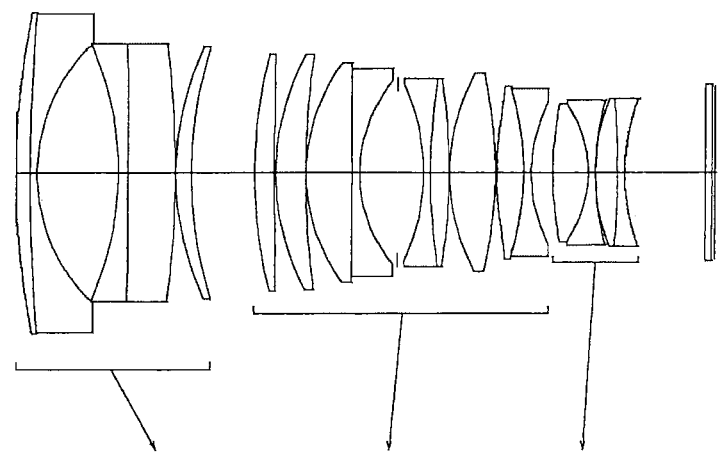
Figure 1C:
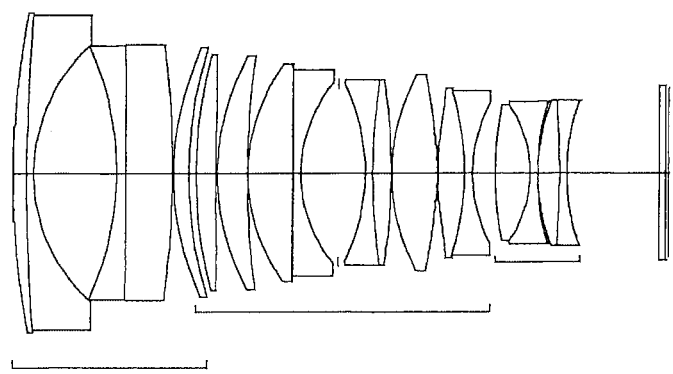

FIG. 1A, FIG. 1B and FIG. 1C are sectional views, respectively, in a wide angle end state, in an intermediate focal length state and in a telephoto end state, of a variable magnification optical system relating to a First Example. In FIG. 1A, arrows below the respective lens groups show movement directions of the respective lens groups from the wide angle end state to the intermediate focal length state upon varying magnification. In FIG. 1B, arrows below the respective lens groups show movement directions of the respective lens groups from the intermediate focal length state to the telephoto end state upon varying magnification.

The variable magnification optical system according to the present Example is composed of, in order from an object side, a first lens group G1 having negative refractive power, a second lens group G2 having positive refractive power and a third lens group G3 having positive refractive power.

The first lens group G1 consists of, in order from the object side, a cemented negative lens constructed by a positive meniscus lens L11 having a convex surface facing the object side cemented with a negative meniscus lens L12 having a convex surface facing the object side, a cemented negative lens constructed by a double concave negative lens L13 cemented with a positive meniscus lens L14 having a concave surface facing the object side, and a positive meniscus lens L15 having a convex surface facing the object side.

A double convex air lens La1 is formed by an image side lens surface of the negative meniscus lens L12 and an object side lens surface of the negative lens L13.

The second lens group G2 consists of, in order from the object side, a double convex positive lens L21, a positive meniscus lens L22 having a convex surface facing the object side, a positive meniscus lens L23 having a convex surface facing the object side, a negative meniscus lens L24 having a convex surface facing the object side, an aperture stop S, a cemented negative lens constructed by a double concave negative lens L25 cemented with a double convex positive lens L26, a double convex positive lens L27, and a cemented negative lens constructed by a double convex positive lens L28 cemented with a double concave negative lens L29.

A double convex air lens La2 is formed by an image side lens surface of the negative meniscus lens L24 and an object side lens surface of the negative lens L25.

The third lens group G3 consists of, in order from the object side, a cemented positive lens constructed by a double convex positive lens L31 cemented with a double concave negative lens L32, and a cemented positive lens constructed by a double convex positive lens L33 cemented with a double concave negative lens L34.

A filter group FL consisting of low pass filter and the like is disposed between the third lens group G3 and the image plane I.

On the image plane I, an imaging device (not illustrated) composed of CCD, CMOS or the like, is disposed.

In the variable magnification optical system as configured above, upon varying magnification from the wide angle end state to the telephoto end state, the first lens group G1, the second lens group G2 and the third lens group G3 are moved along the optical axis such that an interval between the first lens group G1 and the second lens group G2 and an interval between the second lens group G2 and the third lens group G3 are varied. In detail, the first lens group G1 is moved toward the image side, the second lens group G2 is moved toward the object side, and the third lens group G3 is moved toward the object side.

In the variable magnification optical system relating to the present Example, focusing from an infinite distance object to a close distance object is carried out by moving the first lens group G1 and the second lens group G2, respectively, along the optical axis toward the object side.

Table 1 below shows various values associated with the variable magnification optical system relating to the present Example.

In Table 1, "f" denotes a focal length, BF (air conversion length) denotes an air conversion back focus, that is, a distance on the optical axis from the most image side lens surface to the image plane I in which air-conversion is made with respect to thickness of the filter group FL.

In [Surface Data], "m" denotes a surface number that is an order of a lens surface counted from the object side, "r" denotes a radius of curvature, "d" denotes a face-to-face interval (that is, an interval from an n-th surface to an (n+1)-th surface, where n is an integer), "nd" denotes refractive index for d-line (wavelength 587.6 nm), "vd" denotes an Abbe number for d-line (wavelength 587.6 nm), and "θgF" denotes a partial dispersion ratio by g-line and F-line. Meanwhile, "θgF" is indicated only with respect to the lens satisfying the conditional expression (14). Further, "OP" denotes an object surface, "Dn" (where "n" is an integer) denotes a variable surface-to-surface interval, "ST" denotes an aperture stop, and "I" denotes an image plane. Meanwhile, radius of curvature r=∞ denotes a plane surface, and refractive index of the air nd=1.00000 is omitted. In addition, a position of an aspherical lens surface is expressed by attaching "*" to the surface number, and in the column of the radius of curvature "r", a paraxial radius of curvature is shown.

In [Aspherical Surface Data], with respect to an aspherical surface shown in [Surface Data], aspherical surface coefficients and conic constants are shown in the case where the aspherical surface is exhibited by the following expression:

$$X = (h^2/r)/\left[1 + [1 - \kappa(h/r)^2]^{1/2}\right] + bh^4 + ch^6 + dh^8 + eh^{10} + fh^{12} + gh^{14}$$

where "h" denotes a height vertical to the optical axis, "X" denotes a sag amount that is a distance along the optical axis from the tangent plane at the vertex of each aspherical surface at a vertical height "h" to each aspherical surface; "κ" denotes a conic constant; "b", "c", "d", "e", "f" and "g" denote respective aspherical coefficients, and "r" denotes a paraxial radius of curvature that is a radius of curvature of a reference sphere. "E−n", where n is an integer, denotes "×10$^{-n}$", for example, "1.234E-05" denotes "1.234×10$^{-5}$". The second order aspherical coefficient is 0 and omitted.

In [Various Data], "f" denotes a focal length of the optical system as a whole, "FNo" denotes an F-number, "2ω" denotes a whole angle of view (unit "°"), "Y" denotes a maximum image height, "TL" denotes a total length of the optical system relating to the present Example, that is, a distance along the optical axis from the first surface of the lens surface to the image plane I, and "BF (air conversion length)" denotes a back focus of which air conversion is made with respect to thickness of the filter group F. In addition, "W" denotes a wide angle end state, and "T" denotes a telephoto end state.

In [Variable Interval Data Upon Shooting Infinite Distance Object] and [Variable Interval Data Upon Shooting Short Distance Object], "f" denotes a focal length of the optical system as a whole, "β" denotes a close distance object shooting magnification, "Dn" (where "n" is an integer) denotes a variable interval between an n-th surface and an (n+1)-th surface. Meanwhile, "W" denotes a wide angle end state, and "T" denotes a telephoto end state.

In [Lens Group Data], a starting surface number "ST" and a focal length "f" of each lens group are shown.

In [Values for Conditional Expressions], values corresponding to the respective conditional expressions are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to "mm".

Meanwhile, the explanation of reference symbols in Table 1 described above, is the same in Tables for the other Examples described hereinafter.

TABLE 1

First Example

[Surface Data]

| m | r | d | nd | vd | θgF |
|---|---|---|---|---|---|
| OP | ∞ | | | | |
| 1 | 203.370 | 3.64 | 1.851080 | 40.12 | |
| 2 | 510.301 | 1.80 | 1.516800 | 64.14 | |
| 3 | 44.637 | 21.08 | | | |
| 4 | −80.848 | 2.47 | 1.612660 | 44.46 | |
| 5 | −2397.641 | 12.00 | 1.945944 | 17.98 | 0.6544 |
| 6 | −254.439 | 0.20 | | | |
| 7 | 75.132 | 3.95 | 1.497820 | 82.57 | |
| 8 | 105.296 | D8 | | | |
| 9 | 113.645 | 5.18 | 1.883000 | 40.69 | |
| 10 | 2334.491 | 0.38 | | | |
| 11 | 61.855 | 7.75 | 1.593190 | 67.90 | |
| 12 | 217.476 | 0.20 | | | |
| 13 | 47.727 | 11.49 | 1.593190 | 67.90 | |
| 14 | −3683.921 | 0.20 | | | |
| 15 | −10584.330 | 1.80 | 1.737999 | 32.33 | |
| 16 | 37.944 | 9.34 | | | |
| 17 | ST | 6.65 | | | |
| 18 | −52.838 | 1.80 | 1.737999 | 32.33 | |
| 19 | 154.360 | 4.91 | 1.497820 | 82.57 | |
| 20 | −156.174 | 0.20 | | | |
| 21 | 50.924 | 12.00 | 1.851080 | 40.12 | |
| 22 | −100.909 | 0.20 | | | |
| 23 | 78.745 | 6.79 | 1.851080 | 40.12 | |
| 24 | −72.675 | 1.80 | 1.737999 | 32.33 | |
| 25 | 40.318 | D25 | | | |
| 26 | 91.079 | 9.11 | 1.755000 | 52.34 | |
| 27 | −30.849 | 1.80 | 1.728250 | 28.38 | |
| 28 | 64.183 | 0.20 | | | |
| 29 | 53.321 | 5.65 | 1.945944 | 17.98 | |
| 30 | −226.556 | 1.80 | 1.688930 | 31.16 | |
| 31 | 57.636 | D31 | | | |
| 32 | ∞ | 1.60 | 1.516800 | 64.14 | |
| 33 | ∞ | 1.00 | | | |
| I | ∞ | | | | |

[Aspherical Surface Data]

m: 2
κ = 0
b = 4.31945E−09 c = −1.18472E−11 d = −5.75372E−15
e = −8.70882E−19
f = 4.21310E−16 g = −2.71650E−1
m: 24
κ = 0
b = 4.91026E−07 c = −4.58183E−10 d = 9.85325E−13
e = −4.67828E−16
m: 25
κ = 0
b = −3.58091E−06 c = −2.63577E−09 d = −7.51565E−14
e = 7.95416E−16
m: 33
κ = 0
b = 2.87452E−06 c = −1.25611E−08 d = 7.40442E−11
e = −2.49540E−13

| | W | T |
|---|---|---|
| [Various Data] | | |
| f | 35.00 | 51.60 |
| FNo | 1.23 | 1.23 |
| Y | 21.70 | 21.70 |
| 2ω | 72.14 | 46.70 |
| TL | 210.04 | 168.19 |
| BF(air conversion length) | 17.77 | 25.82 |
| [Variable Interval Data Upon Shooting Infinite Distance Object] | | |
| f | 35.000 | 51.600 |
| D8 | 52.543 | 1.851 |
| D25 | 4.785 | 5.578 |
| D31 | 15.720 | 23.767 |
| [Variable Interval Data Upon Shooting Short Distance Object] | | |
| β | −0.100 | −0.100 |
| D8 | 47.880 | 9.925 |
| D25 | 11.522 | 10.856 |
| D31 | 15.720 | 23.767 |

[Lens Group Data]

| | W | T |
|---|---|---|
| | ST | f |
| G1 | 1 | −103.72 |
| G2 | 9 | 60.29 |
| G3 | 26 | 178.15 |

[Values for Conditional Expressions]

(1) (−f1)/f2 = 1.720
(2) (−f1)/fw = 2.963
(3) FNo = 1.230
(4) f21/f2 = 2.242
(5) f22/f2 = 2.373
(6) f2F/f2 = 1.158
(7) f2A/f2 = 1.158
(8) f1R/(−f1) = 4.868
(9) r3R/Bf3w = 3.243
(10) r2R/Bf2w = 1.223
(11) Bfw/fw = 0.508
(12) 2ωw = 72.14°
(13) 2ωt = 46.70°
(14) θgFLp + 0.0022*vdLp = 0.694
(15) Pex/fw = 1.597

TABLE 1-continued

First Example

(16) (r2L1 + r1L1)/(r2L1 − r1L1) = 0.289
(17) (r2L2 + r1L2)/(r2L2 − r1L2) = 0.164

Figure 2A:
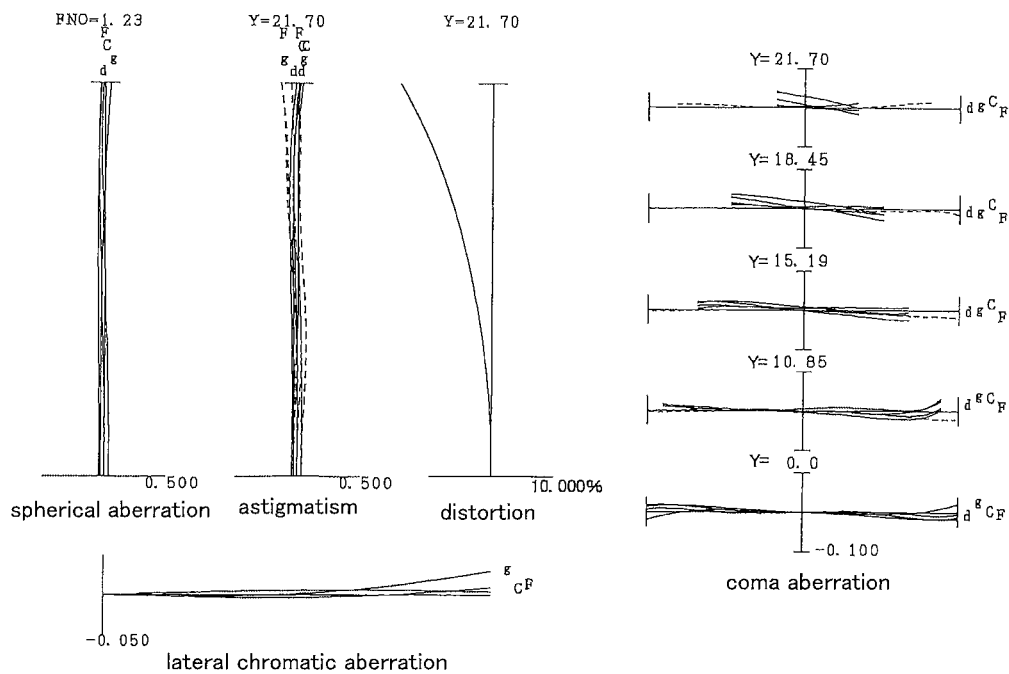
FIG. 2A and FIG. 2B are, respectively, graphs showing various aberrations in the wide angle end state and in the telephoto end state, of the variable magnification optical system according to the First Example, upon focusing on an infinite distance object.
Figure 2B:
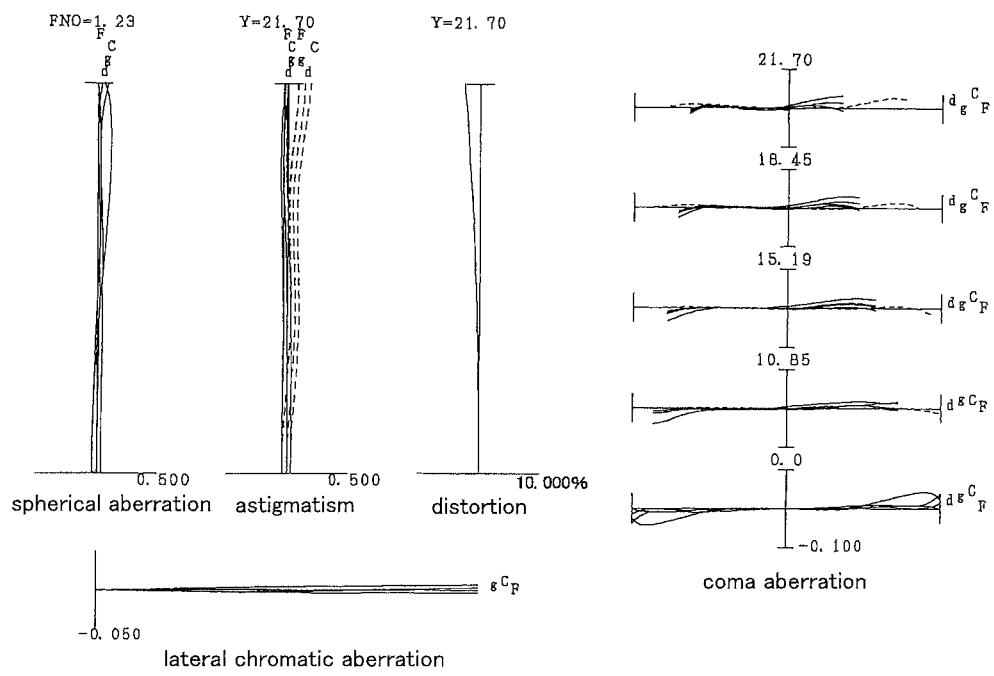
Figure 3A:
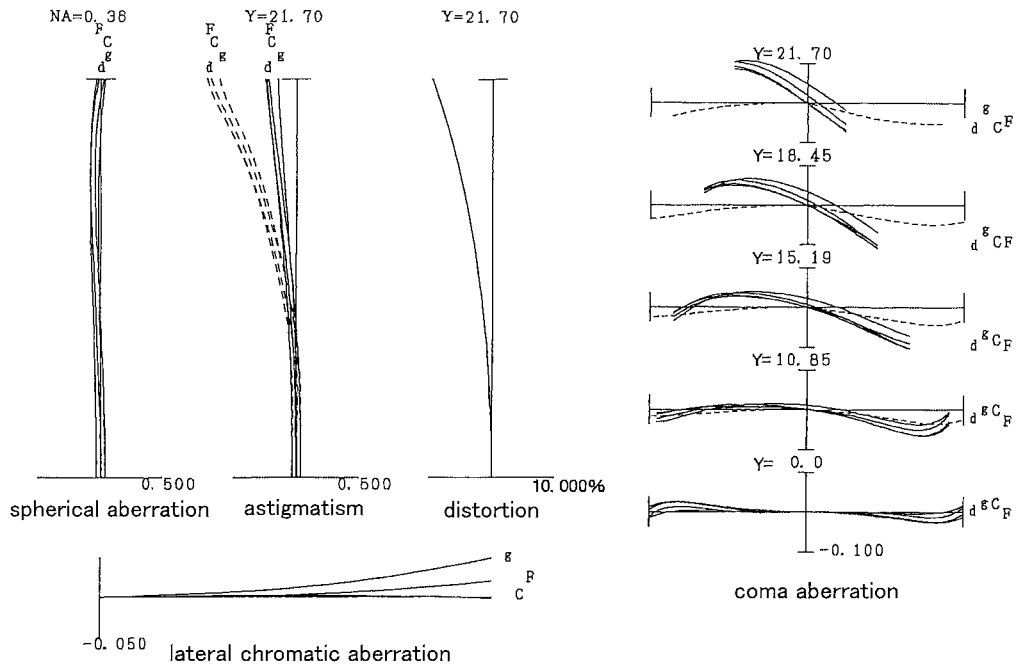
FIG. 3A and FIG. 3B are, respectively, graphs showing various aberrations in the wide angle end state and in the telephoto end state, of the variable magnification optical system according to the First Example, upon focusing on a short distance object.
Figure 3B:
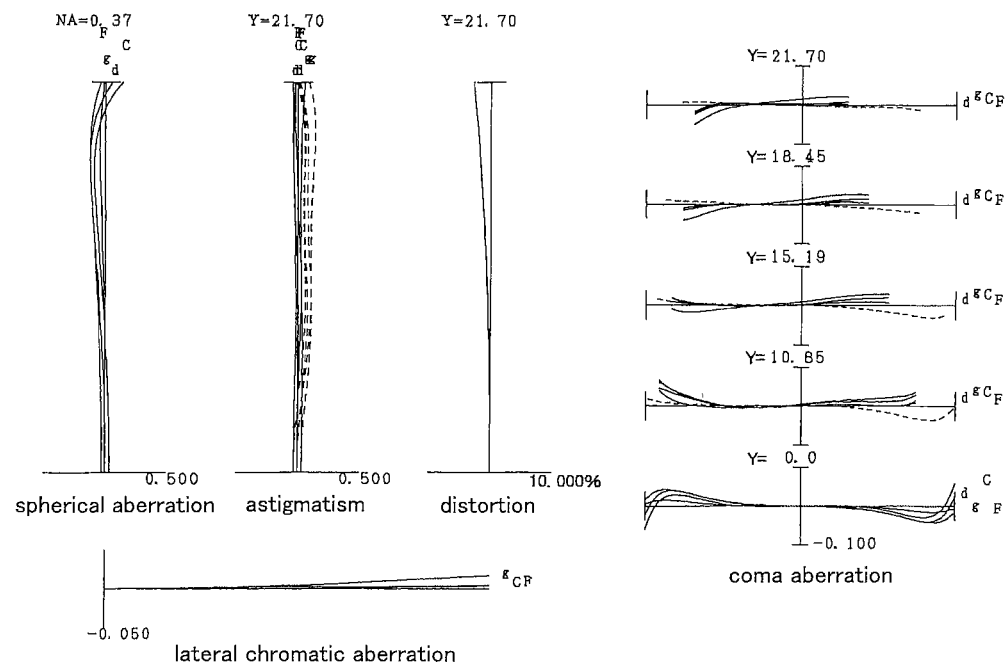

FIG. 2A and FIG. 2B are, respectively, graphs showing various aberrations upon focusing on an infinite distance object in the wide angle end state and in the telephoto end state, of the variable magnification optical system relating to the First Example. FIG. 3A and FIG. 3B are, respectively, graphs showing various aberrations upon focusing on a short distance object in the wide angle end state and in the telephoto end state, of the variable magnification optical system relating to the First Example.

In the respective graphs showing aberrations, "FNO" denotes an F-number, "Y" denotes an image height, and "NA" denotes a numerical aperture. Meanwhile, in graphs showing spherical aberration, values of F-number FNO or the numerical aperture NA with respect to the maximum aperture are shown. In graphs showing astigmatism and distortion, the respective maximum values of the image height Y are shown. In graphs showing coma aberration, the value for each image height is shown. Further, in the respective graphs showing aberrations, "C" denotes aberration curves for C-line (wavelength 656.3 nm), "d" denotes aberration curves for d-line (wavelength 587.6 nm), "F" denotes aberration curves for F-line (wavelength 486.1 nm), and "g" denotes aberration curves for g-line (wavelength 435.8 nm). Graphs having no line indication are aberration curves for d-line.

In graphs showing astigmatism, a solid line indicates a sagittal image plane, and a broken line indicates a meridional image plane. In graphs showing coma aberration, a solid line indicates a meridional coma aberration, and a broken line indicates a sagittal coma aberration for d-line. Graphs showing coma aberration are with respect to the respective image heights Y.

Meanwhile, in graphs showing various aberrations in the other Example as described hereinafter, the same symbols as in the present Example are employed.

As is apparent from the above-mentioned respective graphs showing various aberrations, it could be understood that the optical system relating to the present Example can correct superbly various aberrations and has an excellent imaging performance, upon focusing on an infinitely distant object to a closely distant object and further over the wide angle end state to the telephoto end state.

Second Example

Figure 4A:
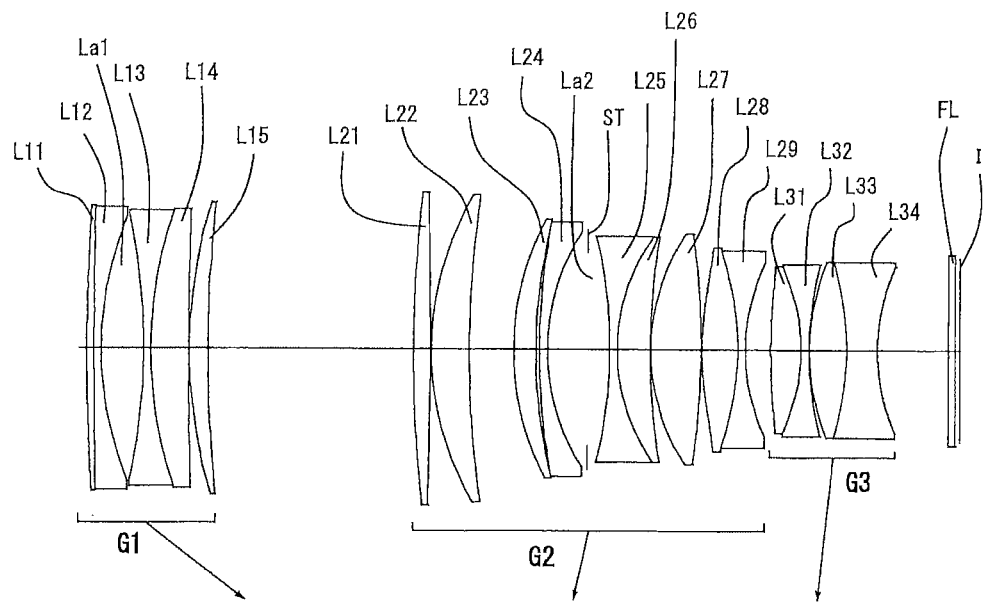
FIG. 4A, FIG. 4B and FIG. 4C are, respectively, sectional views showing wide angle end state, intermediate focal length state and tele photo end state, of a variable magnification optical system according to a Second Example.
Figure 4B:
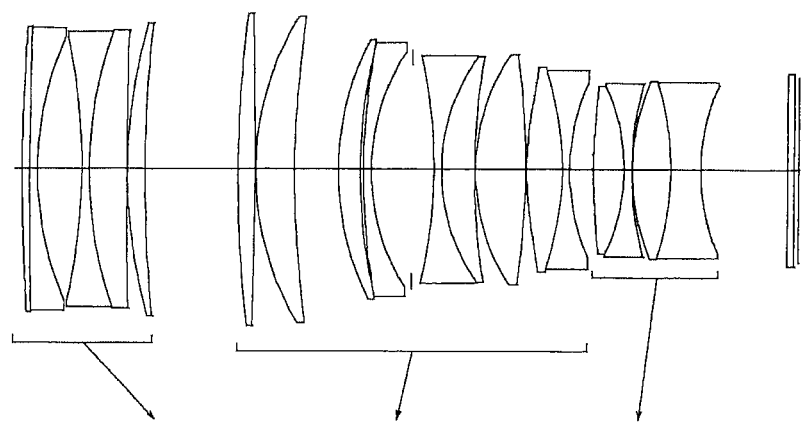
Figure 4C:
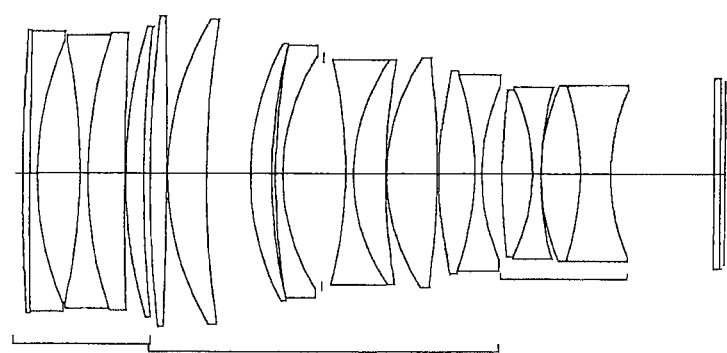

FIG. 4A, FIG. 4B and FIG. 4C are sectional views, respectively, in a wide angle end state, in an intermediate focal length state and in a telephoto end state, of a variable magnification optical system relating to a Second Example.

In FIG. 4A, arrows below the respective lens groups show movement directions of the respective lens groups from the wide angle end state to the intermediate focal length state upon varying magnification. In FIG. 4B, arrows below the respective lens groups show movement directions of the respective lens groups from the intermediate focal length state to the telephoto end state upon varying magnification.

The variable magnification optical system according to the present Example is composed of, in order from an object side, a first lens group G1 having negative refractive power, a second lens group G2 having positive refractive power and a third lens group G3 having positive refractive power.

The first lens group G1 consists of, in order from the object side, a cemented negative lens constructed by a positive meniscus lens L11 having a convex surface facing the object side cemented with a negative meniscus lens L12 having a convex surface facing the object side, a cemented negative lens constructed by a double concave negative lens L13 cemented with a positive meniscus lens L14 having a convex surface facing the object side, and a positive meniscus lens L15 having a convex surface facing the object side.

A double convex air lens La1 is formed by an image side lens surface of the negative meniscus lens L12 and an object side lens surface of the negative lens L13.

The second lens group G2 consists of, in order from the object side, a double convex positive lens L21, a positive meniscus lens L22 having a convex surface facing the object side, a positive meniscus lens L23 having a convex surface facing the object side, a negative meniscus lens L24 having a convex surface facing the object side, an aperture stop S, a cemented negative lens constructed by a double concave negative lens L25 cemented with a positive meniscus lens L26 having a convex surface facing the object side, a double convex positive lens L27, and a cemented negative lens constructed by a double convex positive lens L28 cemented with a double concave negative lens L29.

A double convex air lens La2 is formed by an image side lens surface of the negative meniscus lens L24 and an object side lens surface of the negative lens L25.

The third lens group G3 consists of, in order from the object side, a cemented positive lens constructed by a double convex positive lens L31 cemented with a double concave negative lens L32, and a cemented positive lens constructed by a double convex positive lens L33 cemented with a double concave negative lens L34.

A filter group FL consisting of low pass filter and the like is disposed between the third lens group G3 and the image plane I.

On the image plane I, an imaging device (not illustrated) composed of CCD, CMOS or the like, is disposed.

In the variable magnification optical system as configured above, upon varying magnification from the wide angle end state to the telephoto end state, the first lens group G1, the second lens group G2 and the third lens group G3 are moved along the optical axis such that an interval between the first lens group G1 and the second lens group G2 and an interval between the second lens group G2 and the third lens group G3 are varied. In detail, the first lens group G1 is moved toward the image side, the second lens group G2 is moved toward the object side, and the third lens group G3 is moved toward the object side.

In the variable magnification optical system relating to the present Example, focusing from an infinite distance object to a short distance object is carried out by moving the first lens group G1 and the second lens group G2, respectively, along the optical axis toward the object side.

Table 2 below shows various values associated with the variable magnification optical system relating to the present Example.

TABLE 2

Second Example

[Surface Data]

| m | r | d | nd | vd | θgF |
|---|---|---|----|----|-----|
| OP | ∞ | | | | |
| 1 | 378.611 | 1.80 | 1.851350 | 40.10 | |
| 2 | 1455.072 | 1.80 | 1.698950 | 30.13 | |
| 3 | 78.324 | 10.33 | | | |
| 4 | −145.392 | 1.80 | 1.737999 | 32.33 | |
| 5 | 98.111 | 8.96 | 1.945944 | 17.98 | 0.6544 |
| 6 | 1051.128 | 0.20 | | | |
| 7 | 121.236 | 4.28 | 1.755000 | 52.34 | |
| 8 | 312.075 | D8 | | | |
| 9 | 312.075 | 3.98 | 1.883000 | 40.69 | |
| 10 | −1221.417 | 0.20 | | | |
| 11 | 70.081 | 9.18 | 1.883000 | 40.69 | |
| 12 | 235.398 | 10.68 | | | |
| 13 | 64.520 | 5.31 | 1.755000 | 52.34 | |
| 14 | 124.160 | 0.87 | | | |
| 15 | 163.144 | 1.80 | 1.698950 | 30.13 | |
| 16 | 51.940 | 9.34 | | | |
| 17 | ST | 5.24 | | | |
| 18 | −113.698 | 1.80 | 1.737999 | 32.33 | |
| 19 | 45.808 | 7.78 | 1.755000 | 52.34 | |
| 20 | 156.938 | 0.20 | | | |
| 21 | 48.717 | 12.00 | 1.755000 | 52.34 | |
| 22 | −192.834 | 0.20 | | | |
| 23 | 73.704 | 8.76 | 1.743104 | 49.44 | |
| 24 | −68.563 | 1.80 | 1.854780 | 24.80 | |
| 25 | 50.115 | D25 | | | |
| 26 | 137.845 | 7.15 | 1.882020 | 37.23 | |
| 27 | −47.436 | 1.80 | 1.728250 | 28.38 | |
| 28 | 78.598 | 0.20 | | | |
| 29 | 56.638 | 8.90 | 1.945944 | 17.98 | |
| 30 | −69.524 | 7.47 | 1.688930 | 31.16 | |
| 31 | 50.116 | D31 | | | |
| 32 | ∞ | 1.60 | 1.516800 | 64.14 | |
| 33 | ∞ | 1.00 | | | |
| I | ∞ | | | | |

[Aspherical Surface Data]

m: 2
κ = 0
b = −2.47465E−07 c = −2.79300E−11 d = 3.19445E−15
e = −2.08805E−18
f = 4.21310E−16 g = −2.71650E−19 m: 24
κ = 0
b = −2.58494E−06 c = −1.51263E−09 d = 2.77098E−13
e = −3.29005E−16 m: 25
κ = 0
b = −9.03411E−07 c = −2.80829E−10 d = −4.96146E−13
e = 2.82559E−16 m: 33
κ = 0
b = 2.17609E−06 c = −1.14413E−08 d = 7.19983E−11
e = −2.46180E−13

[Various Data]

| | W | T |
|---|---|---|
| f | 51.60 | 70.00 |
| FNo | 1.23 | 1.23 |
| Y | 21.70 | 21.70 |
| 2ω | 48.78 | 34.53 |
| TL | 210.03 | 169.53 |
| BF(air conversion length) | 18.93 | 26.72 |

[Variable Interval Data Upon Shooting Infinite Distance Object]

| | | |
|---|---|---|
| f | 51.600 | 70.000 |
| D8 | 48.958 | 1.500 |
| D25 | 5.753 | 4.927 |
| D31 | 16.879 | 24.661 |

TABLE 2-continued

Second Example

[Variable Interval Data Upon Shooting Short Distance Object]

| | | |
|---|---|---|
| β | −0.100 | −0.100 |
| D8 | 68.633 | 25.032 |
| D25 | 12.088 | 9.896 |
| D31 | 16.879 | 24.661 |

[Lens Group Data]

| | W ST | T f |
|---|---|---|
| G1 | 1 | −151.28 |
| G2 | 9 | 74.51 |
| G3 | 26 | 110.83 |

[Values for Conditional Expressions]

Figure 5A:
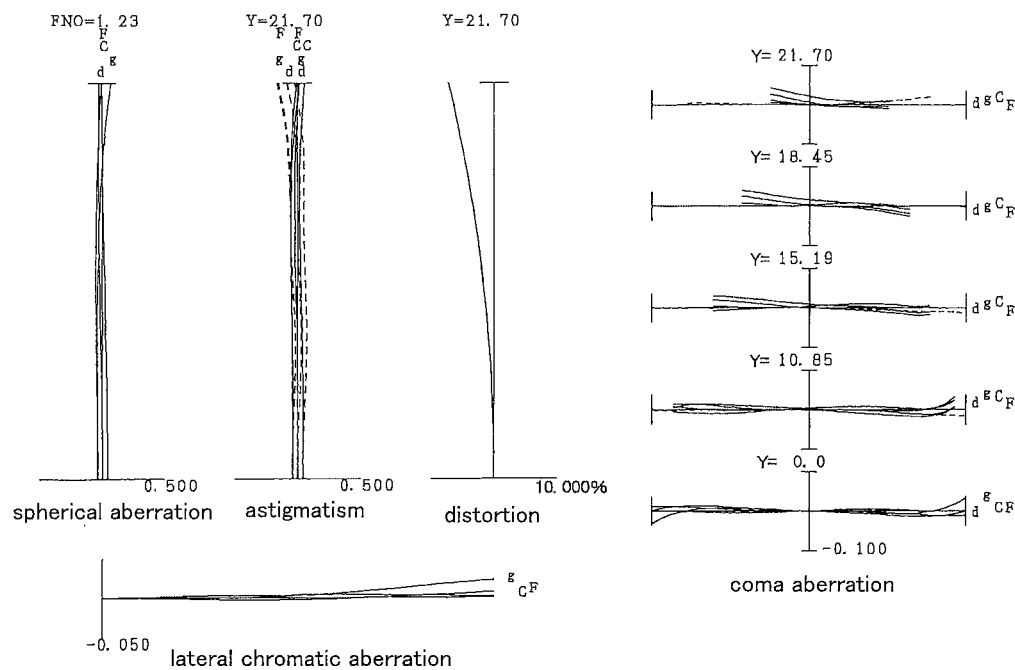
FIG. 5A and FIG. 5B are, respectively, graphs showing various aberrations in the wide angle end state and in the telephoto end state, of the variable magnification optical system according to the Second Example, upon focusing on an infinite distance object.
Figure 5B:
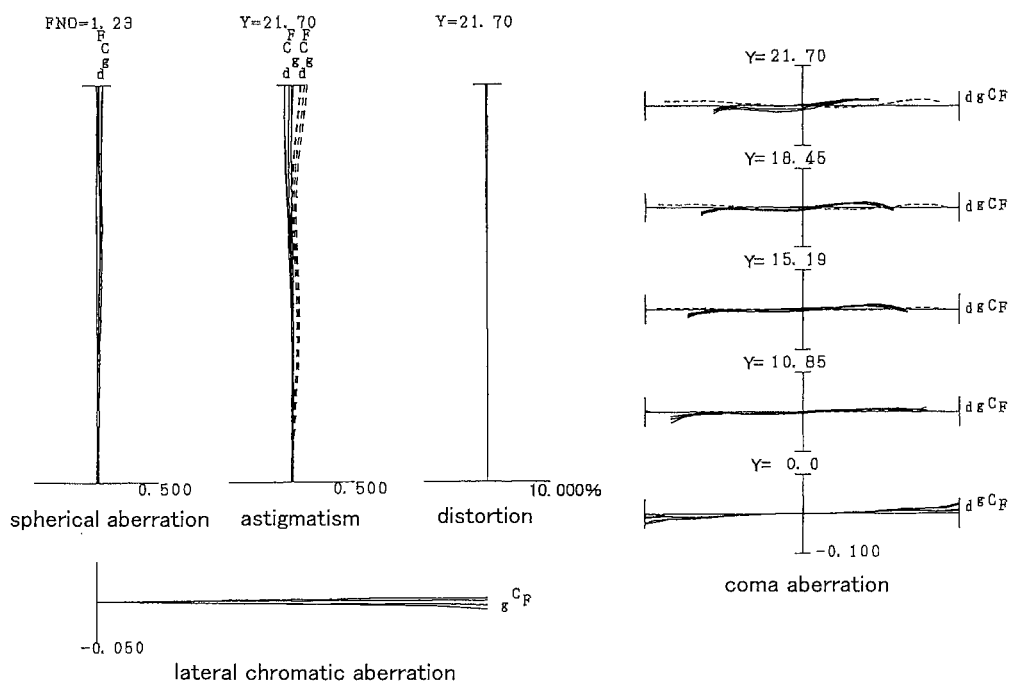
Figure 6A:
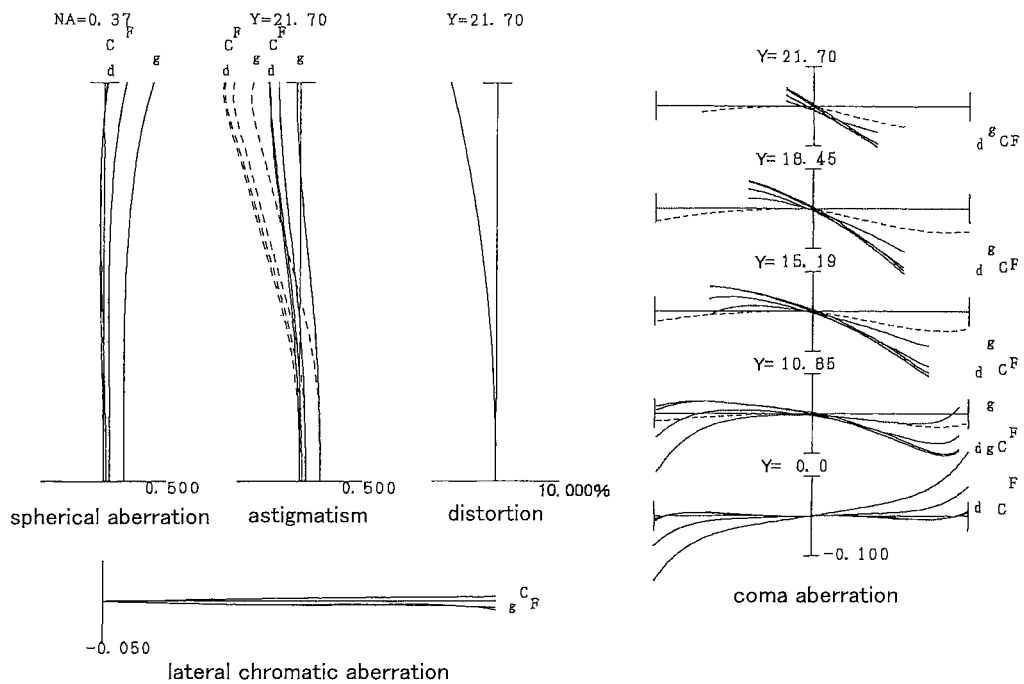
FIG. 6A and FIG. 6B are, respectively, graphs showing various aberrations in the wide angle end state and in the telephoto end state, of the variable magnification optical system according to the Second Example, upon focusing on a short distance object.
Figure 6B:
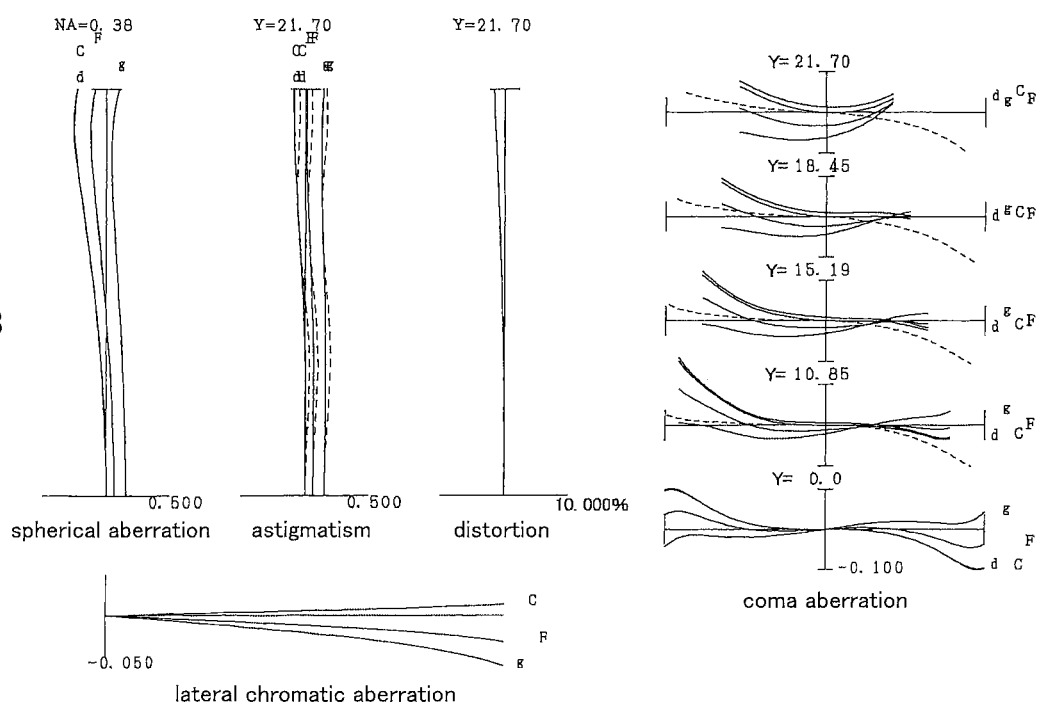

(1) $(-f1)/f2 = 2.030$
(2) $(-f1)/fw = 2.932$
(3) $FNo = 1.230$
(4) $f21/f2 = 3.783$
(5) $f22/f2 = 1.478$
(6) $f2F/f2 = 1.063$
(7) $f2A/f2 = 1.063$
(8) $f1R/(-f1) = 1.719$
(9) $r3R/Bf3w = 2.647$
(10) $r2R/Bf2w = 1.294$
(11) $Bfw/fw = 0.3667$
(12) $2\omega w = 48.78°$
(13) $2\omega t = 34.526°$
(14) $\theta gFLp + 0.0022*vdLp = 0.694$
(15) $Pex/fw = 1.133$
(16) $(r2L1 + r1L1)/(r2L1 − r1L1) = 0.300$
(17) $(r2L2 + r1L2)/(r2L2 − r1L2) = 0.373$ FIG. 5A and FIG. 5B are, respectively, graphs showing various aberrations upon focusing on an infinite distance object in the wide angle end state and in the telephoto end state, of the variable magnification optical system of the Second Example. FIG. 6A and FIG. 6B are, respectively, graphs showing various aberrations upon focusing on a short distance object in the wide angle end state and in the telephoto end state, of the variable magnification optical system of the Second Example.

As is apparent from the above-mentioned respective graphs showing various aberrations, it could be understood that the optical system relating to the present Example can correct superbly various aberrations and has excellent imaging performances, upon focusing on an infinitely distant object to a short distance object and further over the wide angle end state to the telephoto end state.

According to each of the above-mentioned Examples, it is possible to realize a variable magnification optical system which is small in size and has excellent optical performances which can correct various aberrations superbly.

Incidentally, it is noted that each of the above described Examples is a concrete example of the invention of the present application, and the invention of the present application is not limited to them. The contents described below can be adopted without deteriorating optical performance of the variable magnification optical systems according to the present embodiment.

Although variable magnification optical systems each having a three group configuration were illustrated above as numerical examples of the variable magnification optical systems according to the present embodiment, the present embodiment is not limited to them and variable magnification optical systems having other group configurations, such as four group configuration or the like, can be configured. Concretely, a lens configuration that a lens or a lens group is added to the most object side or the most image side of the variable magnification optical systems according to the present application is possible. Alternatively, a lens or a lens group may be added in the neighboring lens groups. Meanwhile, a lens group may be composed of at least one lens.

Further, in the above respective Examples, the first lens group and the second lens group are made to be focusing lens group. Such focusing lens group can be used for auto focus, and suitable for being driven by a motor such as an ultrasonic motor, stepping motor, or VCM motor.

Further, the variable magnification optical systems according to the respective Examples, may be so configured that any lens group or a portion thereof, as a vibration reduction group, may be moved to include a component in a direction perpendicular to the optical axis, or rotationally moved (swayed) in an in-plane direction including the optical axis, whereby vibration reduction is conducted.

Further, in the variable magnification optical systems according to the respective Examples, the function of the aperture stop may be substituted by a lens frame without disposing a member as an aperture stop.

Further, in the variable magnification optical systems according to the respective Examples, a lens surface of a lens may be a spherical surface, a plane surface, or an aspherical surface. When a lens surface is a spherical surface or a plane surface, lens processing, assembling and adjustment become easy, and it is possible to prevent deterioration in optical performance caused by lens processing, assembling and adjustment errors, so that it is preferable. Moreover, even if an image plane is shifted, deterioration in depiction performance is little, so that it is preferable. When a lens surface is an aspherical surface, the aspherical surface may be fabricated by a grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Further, the lens surface(s) of the lenses configuring the variable magnification optical systems according to the respective Examples, may be coated with anti-reflection coating(s) having a high transmittance in a wide wavelength region. With this contrivance, it is feasible to reduce a flare as well as ghost and attain excellent optical performance with high contrast.

Figure 7:
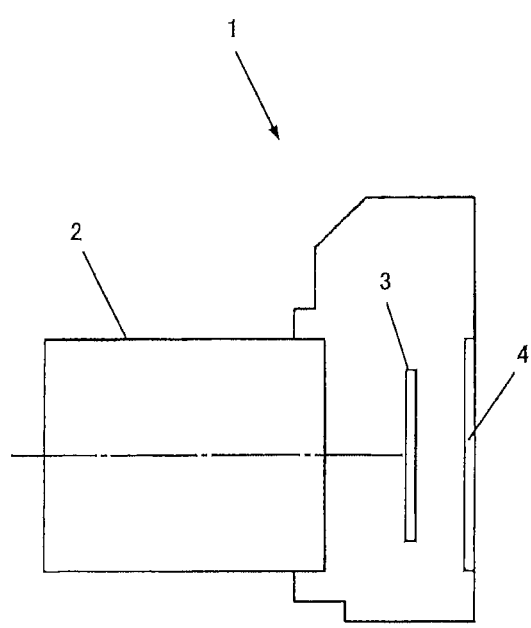
FIG. 7 is a view showing a camera configuration equipped with the variable magnification optical system.

Next, a camera equipped with the variable magnification optical system according to the present embodiment, will be explained with referring to FIG. 7. FIG. 7 is a view showing a configuration of the camera equipped with the variable magnification optical system according to the present embodiment.

As shown in FIG. 7, the present camera 1 is a lens interchangeable type mirror-less camera equipped with the variable magnification optical system according to the First Example as an imaging lens 2.

In the present camera 1, a light emitted from an unillustrated object is converged by the imaging lens 2, passed through an unillustrated OLPF (Optical Low pass filter) and focused on an imaging plane of an imaging portion 3 to form an object image. The object image is photo-electrically converted by a photo-electric conversion device disposed on the imaging portion 3 to form a picture image of the object. This picture image is displayed on an EVF (electric view finder) 4 provided on the camera 1, thereby a photographer being able to observe the object to be photo-taken.

When an unillustrated release button is pushed down by the photographer, the picture image of the object produced by the imaging portion 3 is stored in an unillustrated memory. In this manner, the photographer can take a picture of the object by the present camera 1.

As mentioned above, the variable magnification optical system according to the First Example installed as the imaging lens 2 in the present camera 1, is small in size and has excellent imaging performance that can correct superbly various aberrations upon focusing on from an infinite distance object to the short distance object and from the wide angle end state to the telephoto end state. In other words, the present camera 1 has high optical performance that can correct superbly various aberrations over from the wide angle end state to the telephoto end state, and can be made small in size.

Incidentally, a camera is so configured that a variable magnification optical system according to the Second Example is installed thereon, the camera can attain the same effects as those attained by the above described camera 1.

Further, even in a case where a single lens reflex camera having a quick return mirror and a finder optical system through which an image of an object is observed, is installed with the variable magnification optical system according to each of the above described Examples, the same effects as those attained by the camera 1 are attained.

Figure 8:
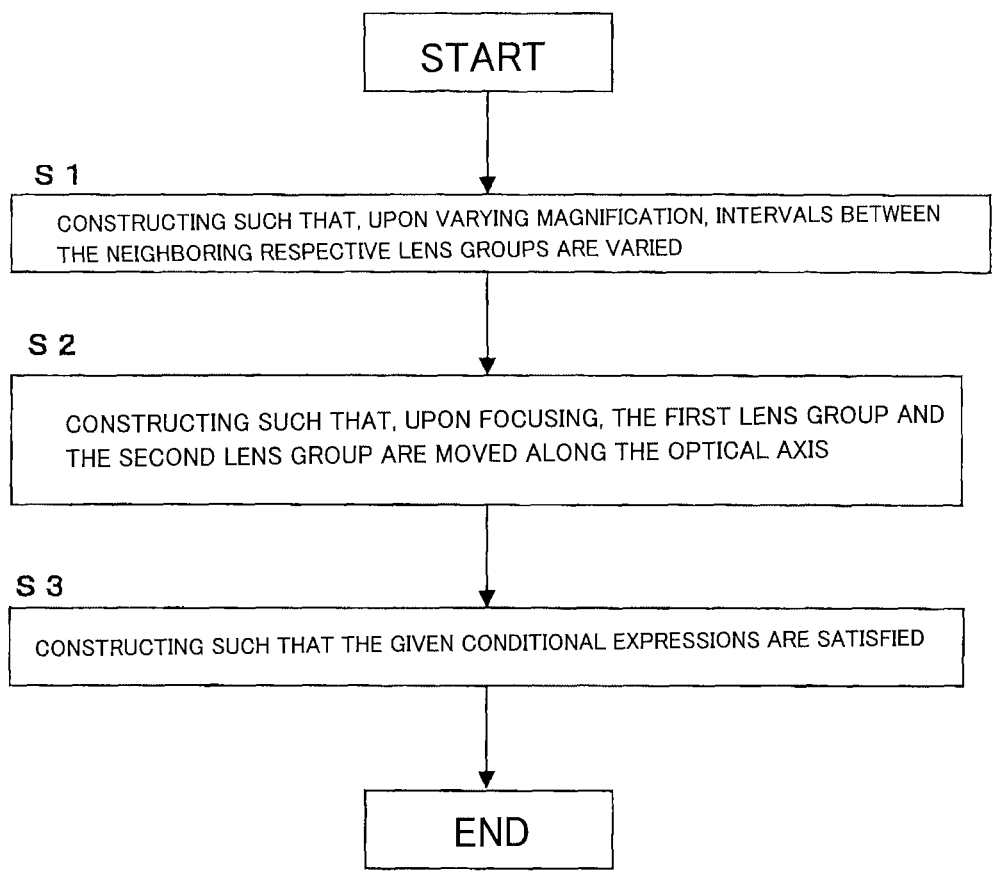
FIG. 8 is a flowchart schematically showing a method for manufacturing the variable magnification optical system.

Next, an outline of a method for manufacturing the variable magnification optical system according to the present embodiment, is described with referring to FIG. 8.

FIG. 8 is a flowchart showing an outline of a method for manufacturing the variable magnification optical system according to the present embodiment.

The method for manufacturing the variable magnification optical system according to the present embodiment as shown in FIG. 8, is a method for manufacturing a variable magnification optical system which comprises, in order from an object side, a first lens group having negative refractive power, a second lens group having positive refractive power and a third lens group, the method comprising the following steps S1 to S3:

Step S1: constructing such that, upon varying magnification, intervals between the neighboring respective lens groups are varied;

Step S2: constructing such that, upon focusing, the first lens group and the second lens group are moved along the optical axis; and Step S3: constructing such that the following conditional expression (1) is satisfied:

$$1.00 < (-f1)/f2 < 3.00 \tag{1}$$

where f1 denotes a focal length of the first lens group, and f2 denotes a focal length of the second lens group.

According to such a method, it is possible to manufacture a variable magnification optical system which is small in size, can correct various aberrations superbly and has high performances.

EXPLANATION OF REFERENCE SYMBOLS

G1 first lens group
GP2 second lens group
GN3 third negative lens group
ST aperture stop
I image plane
1 camera
2 imaging lens

What is claimed is:

1. A variable magnification optical system comprising, in order from an object side, a first lens group having negative refractive power, a second lens group having positive refractive power, and a third lens group;

upon varying magnification, intervals between the neighboring respective lens groups being varied;

upon focusing, the first lens group and the second lens group being moved along the optical axis; and the following conditional expressions being satisfied:

$$1.70 < (-f1)/f2 < 3.00, FNo < 1.45 \text{ and } 2.50 < (-f1)/fw < 3.50$$

where f1 denotes a focal length of the first lens group, f2 denotes a focal length of the second lens group, FNo denotes an F-number of the variable magnification optical system, and fw denotes a focal length of the variable magnification optical system in a wide angle end state.

2. A variable magnification optical system according to claim 1, wherein the second lens group comprises a first positive lens at a most object side, and satisfies the following conditional expression:

$$-1.50 < f21/f2 < 4.50$$

where f21 denotes a focal length of the first positive lens, and f2 denotes the focal length of the second lens group.

3. A variable magnification optical system according to claim 1, wherein the second lens group comprises, in order from a most object side, a first positive lens and a second positive lens, and satisfies the following conditional expression:

$$1.00 < f22/f2 < 3.50$$

where f22 denotes a focal length of the second positive lens, and f2 denotes the focal length of the second lens group.

4. A variable magnification optical system according to claim 1, wherein the second lens group comprises, in order from a most object side, a first positive lens and a second positive lens, and satisfies the following conditional expression:

$$0.50 < f2F/f2 < 2.20$$

where f2F denotes a composite focal length of the first positive lens and the second positive lens, and f2 denotes the focal length of the second lens group.

5. A variable magnification optical system according to claim 1, wherein the second lens group comprises a partial lens group consisting of, in order from the object side consecutively arranged, an "a" positive lens, an "a" negative lens, a "b" negative lens and a "b" positive lens;

an air lens formed by the opposing surfaces of the "a" negative lens and the "b" negative lens is double convex-shaped;

the second lens group has at least one positive lens at a more object side than the partial group, and the following conditional expression is satisfied:

$$0.50 < f2A/f2 < 2.00$$

where f2A denotes a composite focal length of all of positive lenses disposed at the more object side than the partial lens group in the second lens group, and f2 denotes the focal length of the second lens group.

6. A variable magnification optical system according to claim 1, wherein the first lens group comprises a positive lens at a most image plane side, and satisfies the following conditional expression:

$$1.00 < f1R/(-f1) < 6.00$$

where f1R denotes a focal length of the positive lens disposed at the most image plane side in the first lens group, and f1 denotes the focal length of the first lens group.

7. A variable magnification optical system according to claim 1, wherein the following conditional expression is satisfied:

$$1.80 < r3R/Bf3w < 4.30$$

where r3R denotes a radius of curvature of an image plane side lens surface of a lens disposed at a most image plane side in the third lens group, and Bf3w denotes an air conversion distance on the optical axis from the image plane side lens surface of the lens disposed at the most image plane side in the third lens group in the wide angle end state to the image plane.

8. A variable magnification optical system according to claim 1, wherein the following conditional expression is satisfied:

$$0.50 < r2R/Bf2w < 2.20$$

where r2R denotes a radius of curvature of an image plane side lens surface of a lens disposed at a most image plane side in the second lens group, and Bf2w denotes an air-conversion distance on the optical axis from an image plane side lens surface of the lens disposed at the most image plane side in the second lens group in the wide angle end state to the image plane.

9. A variable magnification optical system according to claim 1, wherein the following conditional expression is satisfied:

$$0.15 < Bfw/fw < 1.00$$

where Bfw denotes a back focus of the variable magnification optical system in the wide angle end state, and fw denotes a focal length of the variable magnification optical system in the wide angle end state.

10. A variable magnification optical system according to claim 1, wherein
the following conditional expression is satisfied:

$$35.00° < 2\omega w < 80.00°$$

where 2ωw denotes a whole angle of view of the variable magnification optical system in the wide angle end state.

11. A variable magnification optical system according to claim 1, wherein
the following conditional expression is satisfied:

$$10.00° < 2\omega t < 60.00°$$

where 2ωt denotes a whole angle of view of the variable magnification optical system in the telephoto end state.

12. A variable magnification optical system according to claim 1, wherein
the first lens group comprises at least one positive lens that satisfies the following conditional expression:

$$0.673 < \theta gFLp + 0.0022 * vdLp < 0.750$$

where vdLp denotes an Abbe number to d-line of the positive lens, and θgFLp denotes a partial dispersion ratio by the g-line and the F-line of the positive lens.

13. A variable magnification optical system according to claim 1, wherein
the following conditional expression is satisfied:

$$0.5 < Pex/fw < 2.00$$

where Pex denotes a distance from a paraxial exit pupil position to the image point, and fw denotes a focal length of the variable magnification optical system in the wide angle end state.

14. A variable magnification optical system according to claim 1, wherein
the first lens group and the second lens group each comprise one convex-shaped air lens, and
the following conditional expression is satisfied:

$$-1.00 < (r2L1 + r1L1)/(r2L1 - r1L1) < 3.00$$

where r1L1 denotes a radius of curvature of an object side lens surface of the air lens in the first lens group, and r2L1 denotes a radius of curvature of an image side lens surface of the air lens in the first lens group.

15. A variable magnification optical system according to claim 1, wherein
the first lens group and the second lens group each comprise one convex-shaped air lens, and the following conditional expression is satisfied:

$$-2.00 < (r2L2 + r1L2)/(r2L2 - r1L2) < 2.00$$

where r1L2 denotes a radius of curvature of an object side lens surface of the air lens in the second lens group, and r2L2 denotes a radius of curvature of an image side lens surface of the air lens in the second lens group.

16. A variable magnification optical system according to claim 1, wherein
the first lens group and the second lens group each comprise one convex-shaped air lens, and
there are disposed at least 4 or more positive lenses between the air lens in the first lens group and the air lens in the second lens group.

17. An optical equipment comprising the variable magnification optical system according to claim 1.

18. A variable magnification optical system according to claim 1, wherein upon varying magnification from a wide angle end state to a telephoto end state, the first lens group is moved only toward the image side.

19. A variable magnification optical system comprising, in order from an object side, a first lens group having negative refractive power, a second lens group having positive refractive power, and a third lens group;
upon varying a magnification, intervals between the neighboring respective lens groups being varied;
the first lens group and the second lens group each comprising at least one convex-shaped air lens;
a lens disposed at a most image side having negative refractive power; and
the following conditional expression being satisfied:

$$FNo < 1.45$$

where FNo denotes an F-number of the variable magnification optical system,
the second lens group comprising a first positive lens at a most object side, and satisfying the following conditional expression:

$$1.50 < f21/f2 < 4.50$$

where f21 denotes a focal length of the first positive lens, and f2 denotes the focal length of the second lens group.

20. A variable magnification optical system according to claim 19, wherein upon varying magnification from a wide angle end state to a telephoto end state, the first lens group is moved only toward the image side.

21. A method for manufacturing a variable magnification optical system comprising, in order from an object side, a first lens group having negative refractive power, a second lens group having positive refractive power and a third lens group,
the method comprising a step of:
constructing such that, upon varying magnification, intervals between the neighboring respective lens groups are varied, the method further comprising at least one of the following steps A and B:

the step A including:

constructing such that, upon focusing, the first lens group and the second lens group are moved along the optical axis; and constructing such that the following conditional expressions are satisfied:

$$1.70<(-f1)/f2<3.00, FNo<1.45 \text{ and } 2.50<(-f1)/fw<3.50$$

where f1 denotes a focal length of the first lens group, f2 denotes a focal length of the second lens group, FNo denotes an F-number of the variable magnification optical system, and fw denotes a focal length of the variable magnification optical system in a wide angle end state, the step B including:

constructing such that the first lens group and the second lens group each comprises at least one convex-shaped air lens;

constructing such that a lens disposed at a most image side has negative refractive power;

constructing such that the following conditional expression is satisfied:

$$FNo<1.45$$

and constructing such that the second lens group comprises a first positive lens at a most object side, and satisfies the following conditional expression:

$$1.50<f21/f2<4.50$$

where f21 denotes a focal length of the first positive lens.

22. A method according to claim 21, further comprising a step of constructing such that, upon varying magnification from a wide angle end state to a telephoto end state, the first lens group is moved only toward the image side.

* * * * *